(12) United States Patent
Amano et al.

(10) Patent No.: US 7,496,438 B2
(45) Date of Patent: Feb. 24, 2009

(54) IN-VEHICLE EQUIPMENT SYSTEM

(75) Inventors: Hiroshi Amano, Tokyo (JP); Takao Takahashi, Tokyo (JP); Eiji Yamamoto, Saitama (JP); Hideyuki Uemura, Kanagawa (JP); Kenji Nagashima, Kanagawa (JP); Takumi Arie, Kanagawa (JP)

(73) Assignee: Sony Corporation, Tokyo (JP)

( * ) Notice: Subject to any disclaimer, the term of this patent is extended or adjusted under 35 U.S.C. 154(b) by 492 days.

(21) Appl. No.: 11/016,811

(22) Filed: Dec. 21, 2004

(65) Prior Publication Data

US 2006/0041351 A1     Feb. 23, 2006

(30) Foreign Application Priority Data

Jan. 9, 2004     (JP)     ............... 2004-004790

(51) Int. Cl.
*B60R 22/00* (2006.01)
(52) U.S. Cl. ............... 701/48; 701/200; 455/899
(58) Field of Classification Search ............... 701/48, 701/200; 370/310; 455/457, 899
See application file for complete search history.

(56) References Cited

U.S. PATENT DOCUMENTS 5,823,599 A     10/1998     Gray

| | | | |
|---|---|---|---|
| 6,148,253 A * | 11/2000 | Taguchi et al. | 701/48 |
| 6,356,971 B1 * | 3/2002 | Katz et al. | 710/301 |
| 6,446,080 B1 * | 9/2002 | Van Ryzin et al. | 707/104.1 |
| 6,752,444 B2 * | 6/2004 | Kitano et al. | 296/184.1 |
| 2002/0164973 A1 | 11/2002 | Janik et al. | |
| 2004/0026947 A1 * | 2/2004 | Kitano et al. | 296/24.34 |

FOREIGN PATENT DOCUMENTS

| | | |
|---|---|---|
| EP | 1 193 107 A1 | 4/2002 |
| EP | 1 376 882 A2 | 1/2004 |
| JP | 2000-016187 | 1/2000 |
| JP | 2001-245383 | 9/2001 |
| JP | 2001-310683 | 11/2001 |
| JP | 2003-089330 | 3/2003 |

* cited by examiner

*Primary Examiner*—Mark Hellner
(74) *Attorney, Agent, or Firm*—Oblon, Spivak, McClelland, Maier & Neustadt, P.C.

(57) ABSTRACT

Front-mounted in-vehicle equipment arranged to a front part of a vehicle internal space, rear-mounted in-vehicle equipment arranged to a rear part of the vehicle internal space, and a connection adapted to connect the front-mounted in-vehicle equipment and the rear-mounted in-vehicle equipment is described. Rear-mounted in-vehicle equipment controls the front-mounted in-vehicle equipment via a keyboard or game controller, thereby allowing a passenger to control the front-mounted in-vehicle equipment in a straightforward manner from the rear-mounted in-vehicle equipment instead of the driver operating the front-mounted in-vehicle equipment. The rear-mounted in-vehicle equipment can be denied access to overwriting information related to music data in the front-mounted in-vehicle equipment.

8 Claims, 9 Drawing Sheets

IN-VEHICLE EQUIPMENT SYSTEM

CROSS REFERENCE TO RELATED APPLICATIONS

The present document is based on Japanese Priority Document JP2004-004790, filed to the Japanese Patent Office on Jan. 9, 2004, the contents of which being incorporated herein by reference.

BACKGROUND OF THE INVENTION

1. Field of the Invention

The present invention relates to an in-vehicle equipment system and is particularly suited, for example, to application to in-vehicle equipment system of connecting front-mounted in-vehicle equipment arranged in the vicinity of a driver's seat within a vehicle internal space and rear-mounted in-vehicle equipment arranged in the vicinity of rear seating.

2. Related Art

In the related art, in-vehicle equipment such as car audio equipment, car televisions, car navigation systems and DVD (Digital Versatile Disc) players etc. are arranged within a vehicle internal space, with such in-vehicle equipment becoming more complex and multifunctional, year by year.

Further, it is necessary to input titles etc. relating to music content recorded on a recording medium for in-vehicle equipment such as writable car audio systems etc. employing hard discs or magneto-optical discs etc. as recording media.

SUMMARY OF THE INVENTION

As shown in FIG. 11, in-vehicle equipment 100 is typically arranged on the dashboard in the vicinity of the driver's seat. The in-vehicle equipment 100 is then operated by a driver in the driver's seat or a passenger in a passenger seat through the operation of a remote controller 104 constituted by hardware switches 101 and 102 of the in-vehicle equipment 100, a rotary commander arranged in the vicinity of the shift lever shown in FIG. 12, or through the use of a typical remote control 105 operated by a passenger in a rear seat as shown in FIG. 13.

Further, in-vehicle computer systems also exist where input to a computer main unit located within the vehicle is possible via a keyboard brought to within the vehicle, for example, as disclosed in Japanese patent application publication number H10(1998)-260759.

However, with the in-vehicle equipment 100 (FIG. 11) of this configuration, the number of keys available for the hardware switches 101 and 102 and the remote controller 104 for a typical input means is small. Further, the screen size of a display screen 103 of the in-vehicle equipment 100 shown in FIG. 14 is also relatively small so that a scroll operation is required, which forces a driver in the driving seat to carry out a complex input operation.

Moreover, in the event of carrying out character input, it is necessary to input one character at a time using input means such as the hardware switches 101 and 102 and the remote controller 104 but passengers on the rear seating have to perform the input operation using only the remote controller 104, which makes the input operation quite difficult.

Further, even if an input operation is carried out via a keyboard brought into the vehicle in the in-vehicle computer system shown in the above mentioned Japanese patent application publication number H10(1998)-260759, for example, it is still only possible to use the display having a small screen size arranged at a central position of the front section within the vehicle, and the input operation is therefore not made that much easier.

In order to take the above points into consideration, the present invention has been conceived in order to provide an in-vehicle equipment system where complex input operations can be executed in a more straightforward manner and which provides support for driver input operations.

In order to address these issues, a preferred embodiment of the present invention is provided including front-mounted in-vehicle equipment arranged at a front portion of a vehicle internal space, rear-mounted in-vehicle equipment arranged at a rear part of the vehicle internal space, and connection adapted to connect the front-mounted in-vehicle equipment and the rear-mounted in-vehicle equipment. As a result of the rear-mounted in-vehicle equipment controlling the front-mounted in-vehicle equipment, it is possible for a passenger to control the front-mounted in-vehicle equipment in an extremely straightforward manner from the rear-mounted in-vehicle equipment via input means instead of the driver operating the front-mounted in-vehicle equipment and a passenger can therefore provide support for a driver's seat input operation.

According to another preferred embodiment of the present invention, an in-vehicle equipment system includes front-mounted in-vehicle equipment arranged at the front portion of a vehicle internal space, rear-mounted in-vehicle equipment arranged at the rear part of the vehicle internal space, and connection adapted to connect the front-mounted in-vehicle equipment and the rear-mounted in-vehicle equipment. As a result of the rear-mounted in-vehicle equipment controlling the front-mounted in-vehicle equipment, it is possible for a passenger to control the front-mounted in-vehicle equipment in a straightforward manner from the rear-mounted in-vehicle equipment via input means instead of the driver operating the front-mounted in-vehicle equipment and a passenger can therefore provide support for a driver's seat input operation.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS OF THE INVENTION

The following is a description, with reference to the drawings, of preferred embodiments of the present invention.

(1) First Preferred Embodiment

(1-1) Overall System Configuration of In-vehicle Equipment System

Figure 1:
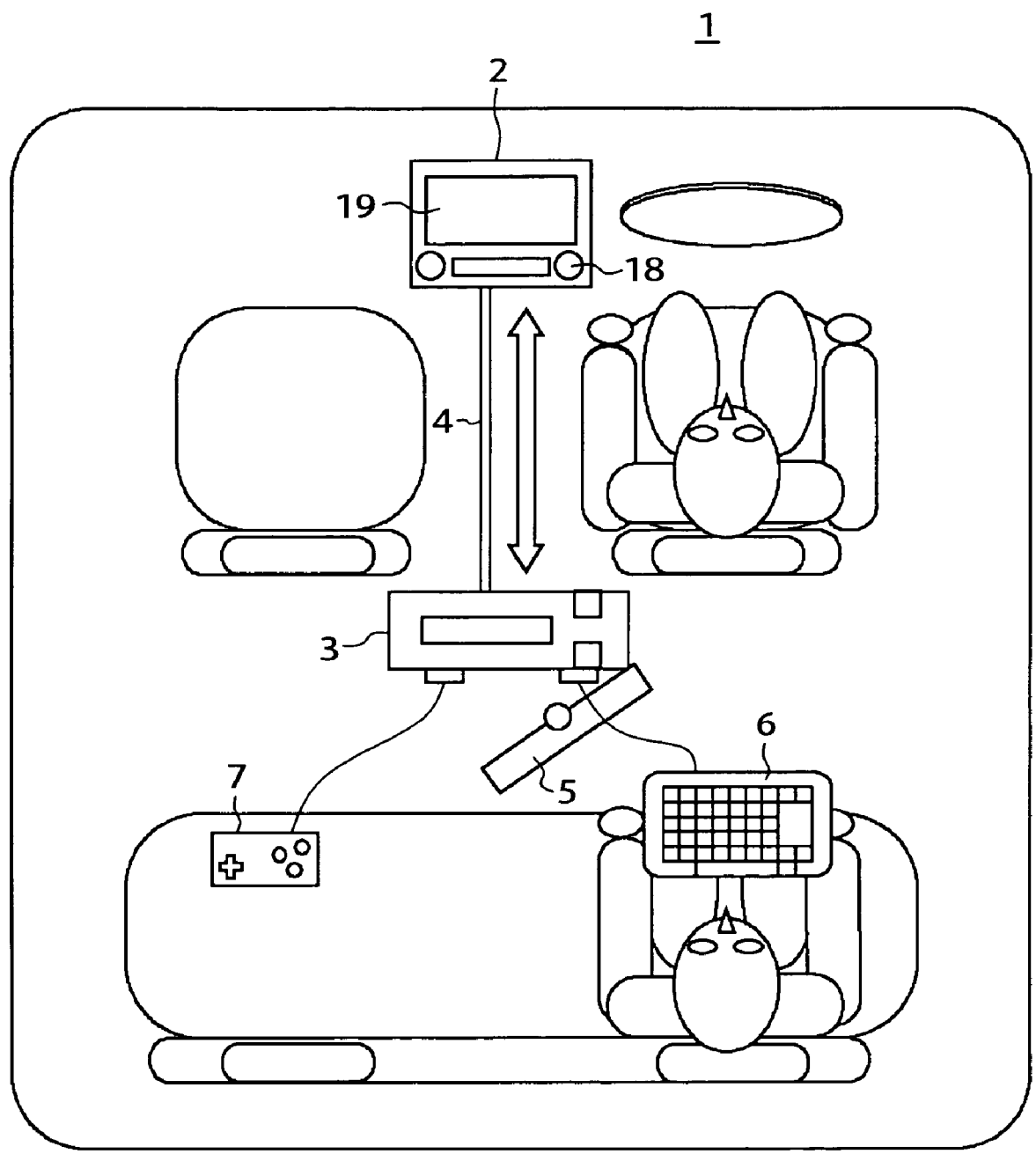
FIG. 1 is an outline view showing an overall configuration of in-vehicle equipment of a first embodiment of the present invention.

In FIG. 1, numeral 1 shows an overview of an in-vehicle equipment system according to a preferred embodiment of the present invention, having a configuration where front-mounted in-vehicle equipment 2 including, for example, an integrated audio unit having a CD (Compact Disc, a trademark) and MD (Mini Disc, a trademark) arranged at a substantially central portion of the dashboard in the vicinity of the driver's seat and rear-mounted in-vehicle equipment 3 constituted by a game device arranged in the vicinity of rear seating connected by a cable 4, for example.

A display section 19 including an LCD (Liquid Crystal Display), and a hardware switch 18 are provided at the front-mounted in-vehicle equipment 2. CD's and MD's are then played back etc. via the hardware switch 18 and various types of display such as display of elapsed playback time are carried out at the display section 19.

A display device 5, keyboard 6, and game controller 7 are connected to the rear-mounted in-vehicle equipment 3. It is therefore possible for a passenger in a rear seat to enjoy games using the rear-mounted in-vehicle equipment 3 by operating the game controller 7, perform complex input operations, and input characters via the keyboard 6 while looking at the screen displayed at the display device 5.

(1-2) Front-mounted In-vehicle Equipment Circuit Configuration

Figure 2:
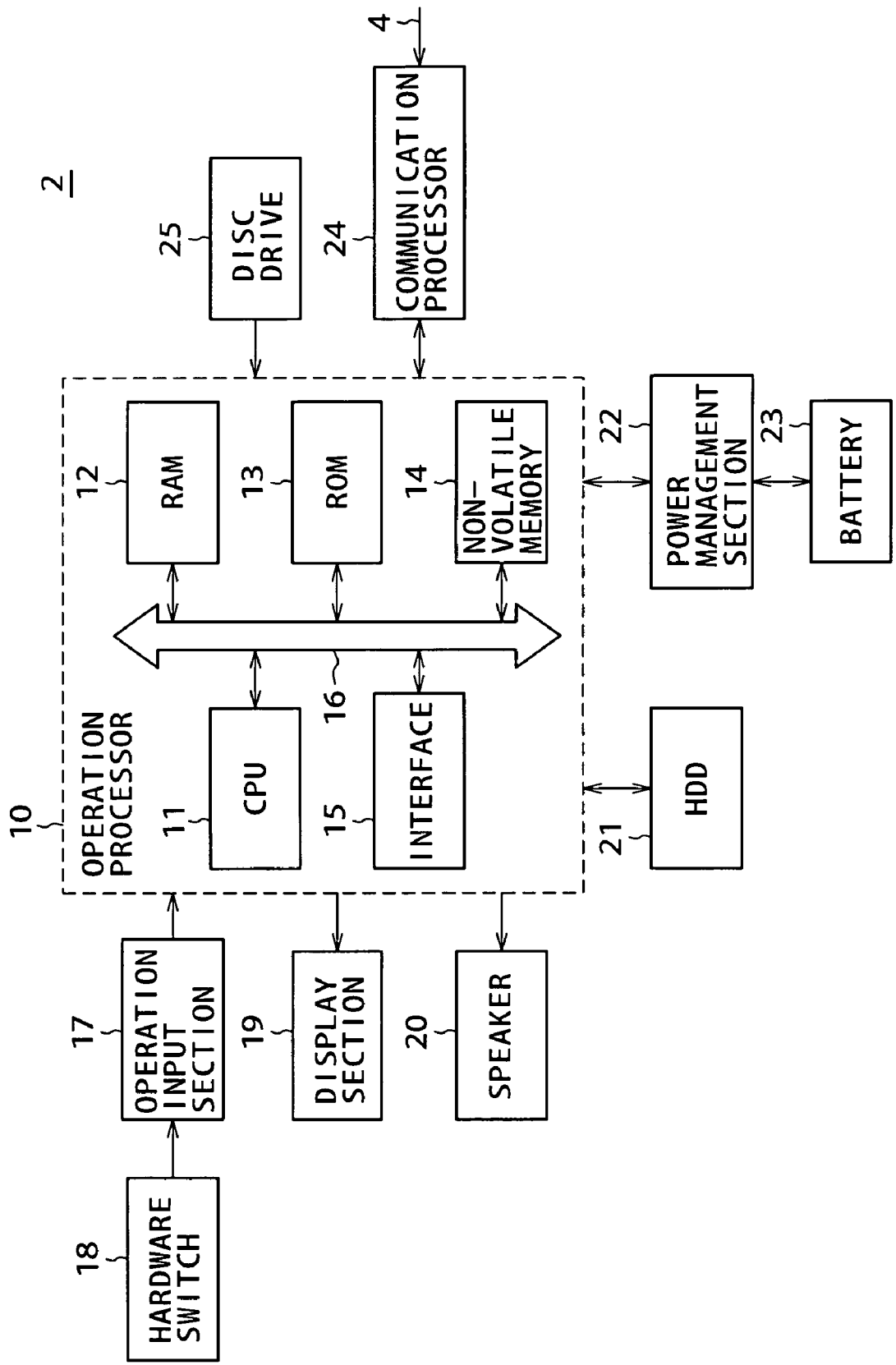
FIG. 2 is an outline block view showing a circuit configuration for front-mounted in-vehicle equipment.

As shown in FIG. 2, the front-mounted in-vehicle equipment 2 operates based on electrical power supplied via a power management section 22 from a battery 23 or vehicle power supply (not shown). Prescribed processing is executed according to basic programs and application programs started up from ROM (Read Only Memory) 13 to RAM (Random Access Memory) 12 by a CPU (Central Processing Unit) 11 of an operation processor 10 via a bus 16. These processing results are then outputted at the display section 19 and the speaker 20 via an interface 15.

The front-mounted in-vehicle equipment 2 receives instructions corresponding to rotating or pressing operations of the hardware switch 18 provided at the surface of the body using a CPU 11 of an operation processor 10 via an operation input section 17. Prescribed processing is then executed according to these instructions so that the disc drive 25 is operated so as to play back a CD or MD, audio files are read out from the non-volatile memory 14 and outputted from the speaker 20, or image data read-out from the hard disc 21 is outputted to the display section 19.

Further, the front-mounted in-vehicle equipment 2 is not limited to instructions from the hardware switch 18 and it is also possible to execute prescribed processing according to instructions from the rear-mounted in-vehicle equipment 3 connected via a communication processor 24 and a cable 4.

(1-3) Circuit Configuration for Rear Vehicle Equipment

Figure 3:
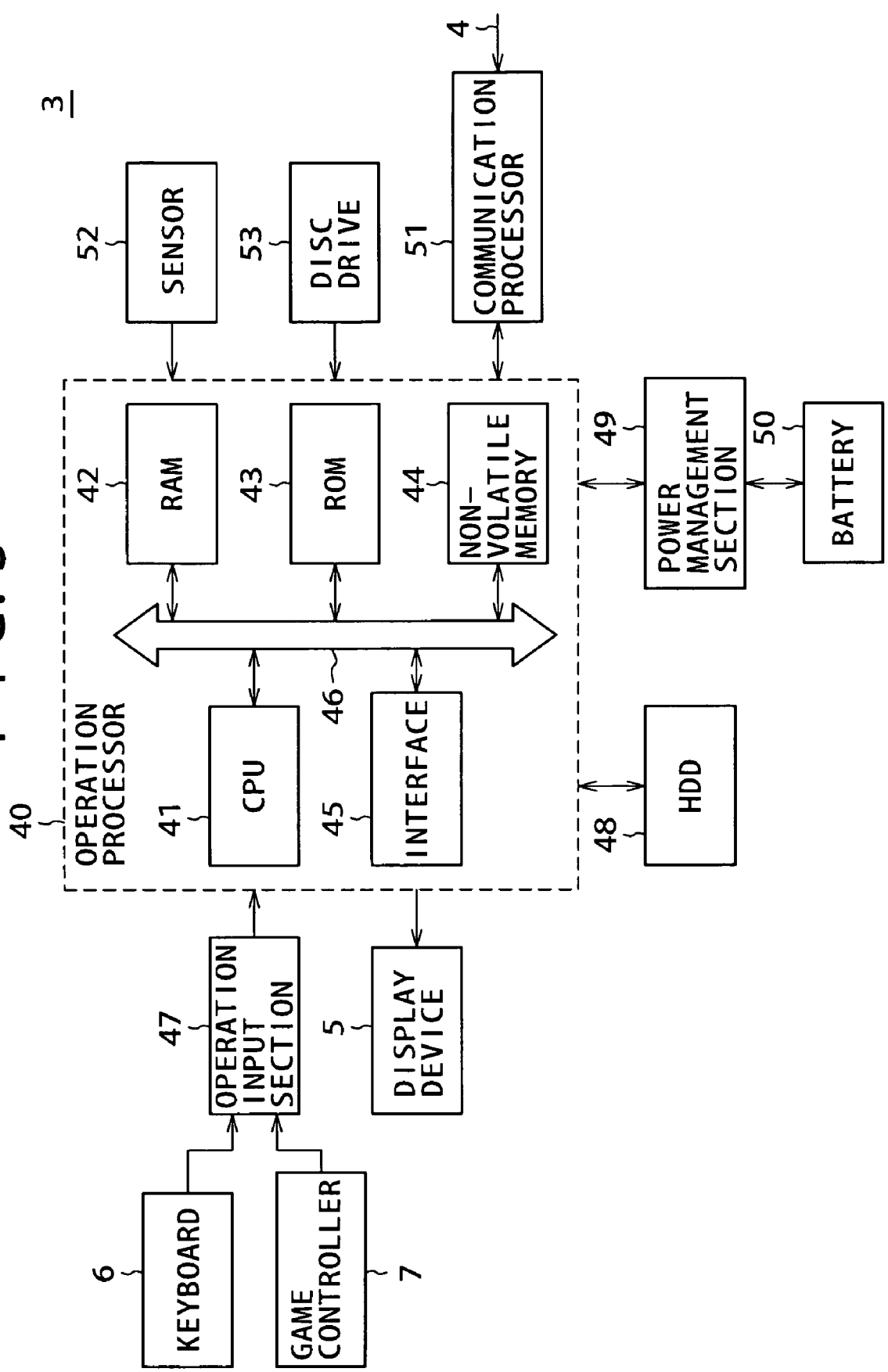
FIG. 3 is an outline block view showing a circuit configuration for rear-mounted in-vehicle equipment.

On the other hand, the rear-mounted in-vehicle equipment 3 shown in FIG. 3 also operates based on electrical power supplied from the battery 50 or on-vehicle power supply (not shown) via a power management section 49, executes prescribed processing according to basic programs and application programs started up from ROM 43 in RAM 42 via a bus 46 by a CPU 41 of an operation processor 40, and outputs the results of this processing from a display device 5 connected via an interface 45.

The rear-mounted in-vehicle equipment 3 receives instructions inputted from the keyboard 6 or game controller 7 via an operation input section 47 using the CPU 41 of the operation processor 40. A disc drive 53 is then activated according to these instructions so that prescribed processing is executed in order that a DVD (Digital Versatile Disc) storing game software is played back and outputted as game images from speakers (not shown) of the display device 5, a saved game program is read from the non-volatile memory 44, or other various types of image data read-out from the hard disc drive 48 are outputted to the display device 5 and displayed, etc.

Further, the rear-mounted in-vehicle equipment 3 also makes transfer requests relating to title information for music data at the front-mounted in-vehicle equipment 2 from the hard disc 21 of the front-mounted in-vehicle equipment 2 and the non-volatile memory 14 according to input operations with respect to the keyboard 6 and game controller 7 connected to the rear-mounted in-vehicle equipment 3.

When the rear-mounted in-vehicle equipment 3 carries out editing operations via the keyboard 6 such as changing of titles or changing the order of the music data etc. based on music data title information received as a result of transfer from the front-mounted in-vehicle equipment 2, edited data for the content expressing the results of this editing is sent back to the front-mounted in-vehicle equipment 2 once again from a communication processor 51 via the cable 4.

The rear-mounted in-vehicle equipment 3 has a sensor 52. The sensor 52 is used to detect whether or not a connection state is maintained with the front-mounted in-vehicle equipment 2, and to detect equipment information such as the presence of fire, heating temperature, operating time of the rear-mounted in-vehicle equipment 3, input information from the game controller 7 and stand-by time for the game controller 7, presence or absence of the batter 50 and the charge remaining, playback audio for a CD or MD, elapsed time for played-back images, remaining time, and media read errors. This information is then transmitted to the CPU 41 and is transmitted to the front-mounted in-vehicle equipment 2 from the CPU 41 via the communication processor 51 and the cable 4.

In addition, the sensor 52 is also capable of detecting whether or not a state of connection is maintained with external equipment such as a controller, PDA (Personal Digital Assistant), memory card, GPS (Global Positioning System) module, mouse, keyboard 6, headphones, power cable, camera, external hard disc, network cable, mobile telephone, LAN (Local Area Network) card, and external media.

Figure 4:
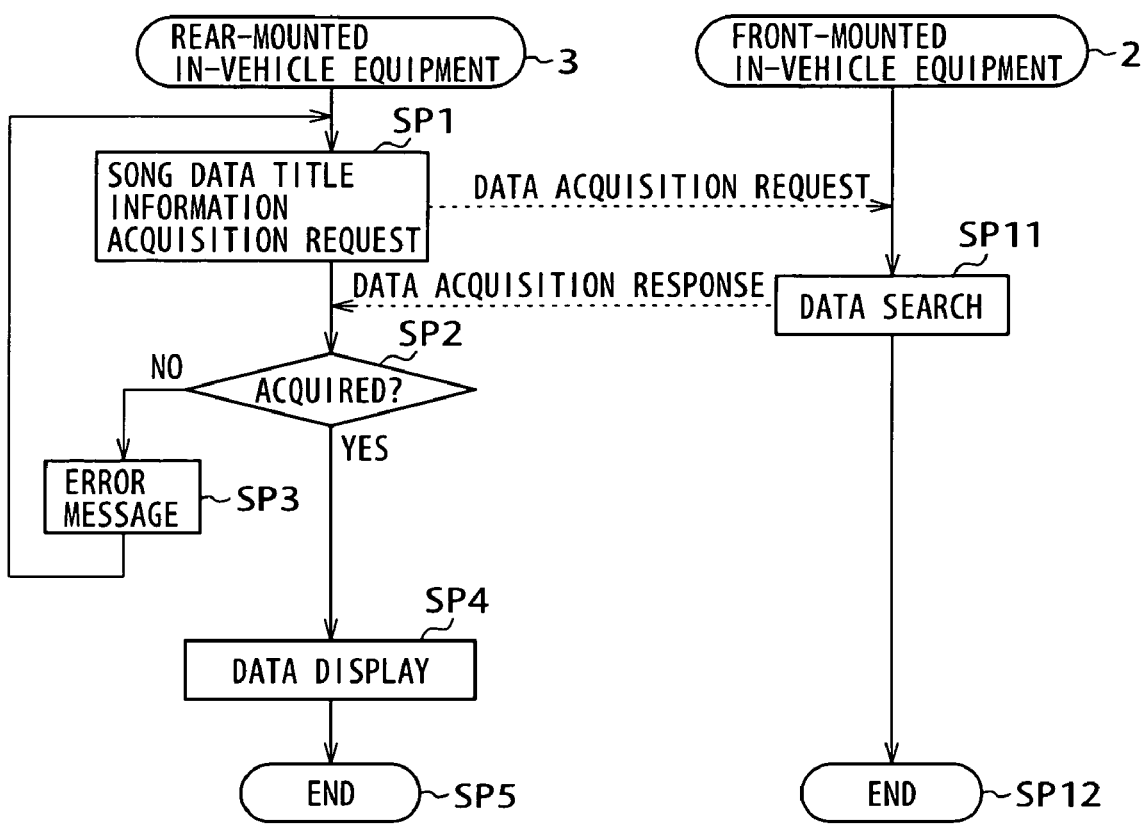
FIG. 4 is a flowchart showing the procedure for music data title information acquisition and display processing.
Figure 5:
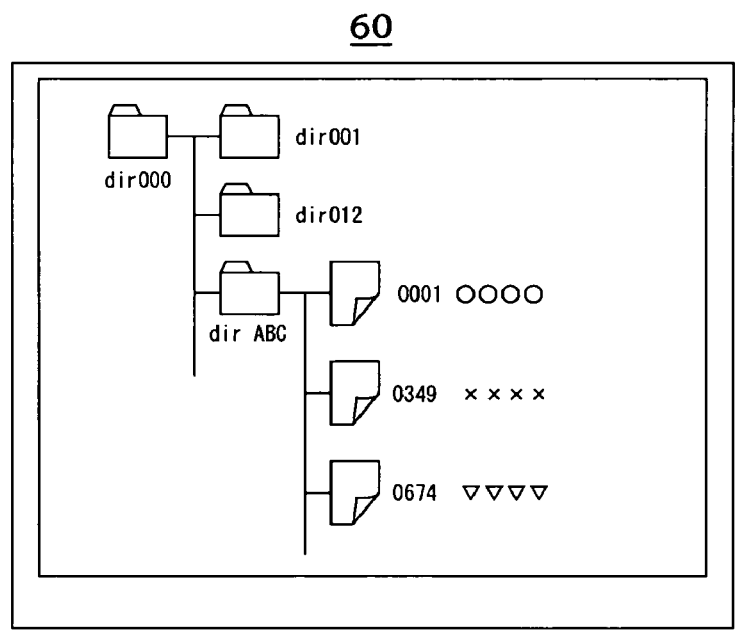
FIG. 5 is an outline view showing an edit screen for the rear-mounted in-vehicle equipment.
Figure 6:
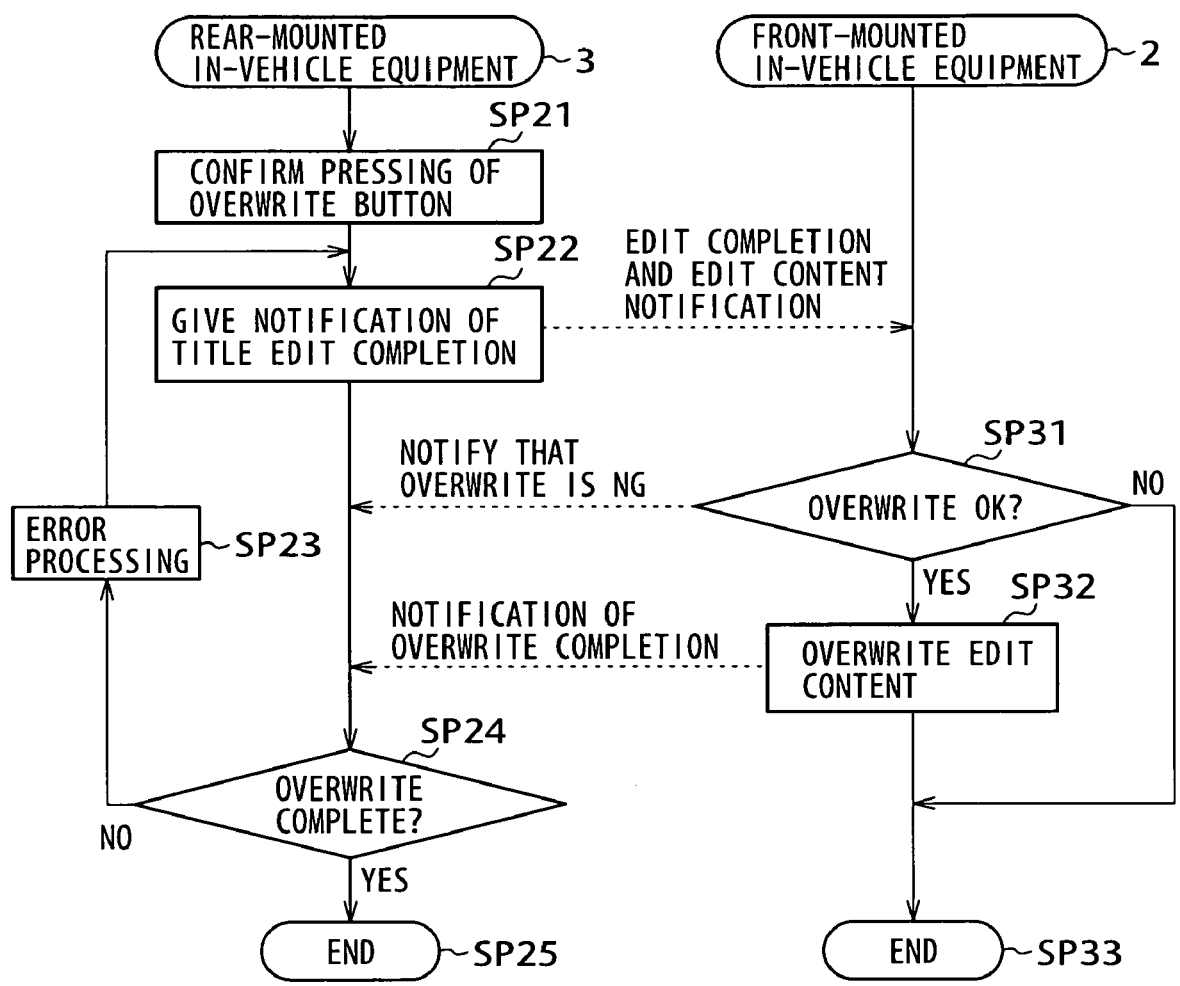
FIG. 6 is a flowchart showing the procedure for data re-writing processing.

(1-4) Processing Procedure for Control of Front-mounted In-vehicle Equipment by Rear-mounted In-vehicle Equipment Next, a description is given using FIG. 4 to FIG. 6 of the process flow of controlling the front-mounted in-vehicle equipment 2 from the rear-mounted in-vehicle equipment 3 at the in-vehicle equipment system 1.

As shown in FIG. 4, in step SP1, when title information for music data in the possession of the front-mounted in-vehicle equipment 2 is acquired by a passenger in the rear seating, when the CPU 41 of the rear-mounted in-vehicle equipment 3 recognizes the setting of edit mode for performing editing, a request to acquire music data title information is made to the front-mounted in-vehicle equipment 2 according to operation of the keyboard 6 and the game controller 7, and step SP2 is proceeded to.

In this event, in step SP11, the CPU 11 of the front-mounted in-vehicle equipment 2 recognizes the content of the acquisition request from the rear-mounted in-vehicle equipment 3, searches for, for example, music data title information in the possession of the front-mounted in-vehicle equipment 2 from the hard disc 21 according to this acquisition request, outputs the results of this search to the rear-mounted in-vehicle equipment 3 and proceeds to the following step SP12 so that processing for the front-mounted in-vehicle equipment 2 is complete.

On the other hand, in step SP2, the CPU 41 of the rear-mounted in-vehicle equipment 3 determines whether or not music data title information constituted by the search results have been acquired from the front-mounted in-vehicle equipment 2. When the results of this determination are negative, step SP3 is proceeded to, an error message such as "acquisition not possible" is displayed at the display device 5, and step SP1 is returned to.

When an affirmative result is obtained in step SP2, this is shown as the CPU 41 of the rear-mounted in-vehicle equipment 3 displaying the acquisition of the music data title information. The CPU 41 of the rear-mounted in-vehicle equipment 3 then proceeds to the next step SP4 and the music data title information is displayed on the display device 5. The next step SP5 is then gone to, and the title information acquisition and display processing procedure are complete.

In this event, the CPU 41 of the rear-mounted in-vehicle equipment 3 shown in FIG. 5 displays an editing screen 60 showing titles ("0001: ◯◯◯◯", "0349: xxxx", "0674: ∇∇∇∇") for files (music data) divided up into folders in a directory structure. Various editing operations such as re-writing titles and directory names, changing the hierarchical structure of the directories or deleting files etc. may then be executed by a passenger using the keyboard 6.

As shown in FIG. 6, in step SP21, the CPU 4 of the rear-mounted in-vehicle equipment 3 carries out editing operations using the editing screen 60 and then proceeds to step SP22 when it is confirmed that the overwrite button of the keyboard 6 has been pressed by a passenger in the rear seating.

In step SP22, the CPU 41 of the rear-mounted in-vehicle equipment 3 notifies the front-mounted in-vehicle equipment 2 that title editing processing by the rear-mounted in-vehicle equipment 3 according to pressing of the overwrite button is complete, transmits the content of these editing results and proceeds to the next step SP24.

In this event, in step SP31, the CPU 11 of the front-mounted in-vehicle equipment 2 determines whether or not there is no problem with overwriting the music data title information in the possession of the front-mounted in-vehicle equipment 2 with the content resulting from editing.

In this event, if it is determined that the driver in the front seat does not authorize the overwriting with the content of the editing results, or in the event that the hard disc 21 constituting the recording target of the overwriting of the content for the editing results or the non-volatile memory 14 are write-protected, a negative result is obtained, and the CPU 11 of the front-mounted in-vehicle equipment 2 notifies the rear-mounted in-vehicle equipment 3 that "overwriting is not possible".

When an affirmative result is obtained in step SP31 in this respect, the CPU 11 of the front-mounted in-vehicle equipment 2 goes to the next step SP32, updates the data by overwriting with the content of the editing results, gives notification of overwrite completion to the rear-mounted in-vehicle equipment 3, proceeds to the next step SP33, and processing is complete.

On the other hand, in step SP24, at the CPU 41 of the rear-mounted in-vehicle equipment 3, a determination is made as to whether or not over-writing is complete. When it is then detected that notification of completion of overwriting has been received from the front-mounted in-vehicle equipment 2, affirmative results are obtained, the next step SP25 is proceeded to, and the data re-writing processing procedure is complete.

With respect to this, in step SP24, the CPU 41 of the rear-mounted in-vehicle equipment 3 obtains a negative result when notification of overwrite completion is not received from the front-mounted in-vehicle equipment 2 and proceeds to step SP23, displays an indication that overwrite processing could not be carried out as error processing on the display device 5, and repeats the processing from step SP22 onwards.

(1-5) Operation and Results

At the in-vehicle equipment system 1, the rear-mounted in-vehicle equipment 3 acquires the music data title information in the possession of the front-mounted in-vehicle equipment 2. This is then displayed at the display device 5 of the rear-mounted in-vehicle equipment 3 so that a passenger in the rear seating can edit music title data etc. possessed by the front-mounted in-vehicle equipment 2 via the keyboard 6.

As a result, the driver in the front seat does not have to edit their own music data titles and it is no longer necessary to perform complex input operations via the hardware switch 18.

Further, at the in-vehicle equipment system 1, the results of editing titles of the music data at the rear-mounted in-vehicle equipment 3 are sent to the front-mounted in-vehicle equipment 2. The results of this editing are then confirmed by the driver and an invitation is also made to determine whether or not to perform overwrite processing. This means that it is possible to always reflect the intent of the driver in the front seat in the content of the results of editing by a passenger in the rear seating. It is therefore possible to prevent the titles of important music data from being overwritten by the driver or to prevent the playback order of the music data from being changed around, etc.

Namely, a driver support system can be implemented at the in-vehicle equipment system 1 where, intrinsically speaking, editing operations to be carried out by the driver at the front-mounted in-vehicle equipment 2 can be implemented by a passenger located in the vicinity of the rear seating instead of the driver via the rear-mounted in-vehicle equipment 3.

Further, at the in-vehicle equipment system 1, the editing operation can be carried out via the keyboard 6 connected to the rear-mounted in-vehicle equipment 3 and the display device 5 with a screen size that is larger than that of the display section 19 of the front-mounted in-vehicle equipment 2 rather than via the hardware switch 18 of the front-mounted in-vehicle equipment 2. The input operation is therefore made more straightforward and easier for operation to the passenger with increased degree of freedom.

According to the above configuration, at the in-vehicle equipment system 1 it is possible for title information for music data possessed by the front-mounted in-vehicle equipment 2 to be acquired from the rear-mounted in-vehicle equipment 3 and for an editing operation to be carried out by a passenger on the display device 5 of the rear-mounted in-vehicle equipment 3 via the keyboard 6. It is therefore possible to implement a driver support system where an editing operation can be executed in a dramatically more straightforward manner inside a vehicle and where a driver is not forced to perform complex input operations.

Figure 7:
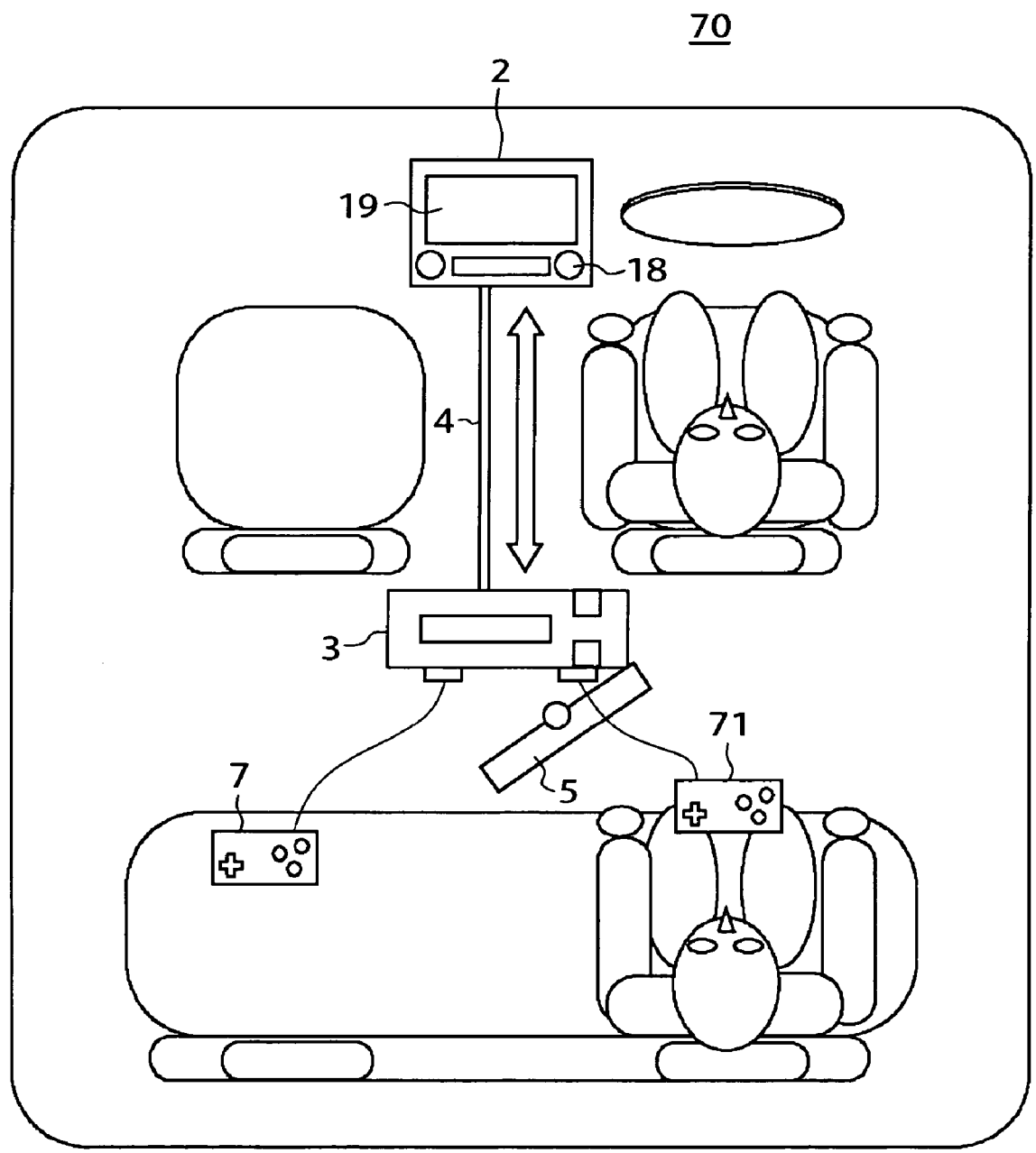
FIG. 7 is an outline view showing an overall configuration of in-vehicle equipment of a second embodiment of the present invention.

(2) Second Preferred Embodiment (2-1) Overall Configuration for In-vehicle Equipment System As shown in FIG. 7 where portions corresponding to those of FIG. 1 are assigned the same numerals, an in-vehicle equipment system 70 of a second preferred embodiment of the invention is configured from the front-mounted in-vehicle equipment 2 arranged at a substantially central portion of the dashboard in the vicinity of the front seating and the rear-mounted in-vehicle equipment 3 arranged in the vicinity of the rear seating connected by the cable 4, as with the in-vehicle equipment system 1 of the first embodiment.

At the rear-mounted in-vehicle equipment 3, the display device 5 and the game controller 7 are connected, with a difference from the in-vehicle equipment system 1 of the first embodiment existing in that a game controller 71 is connected in place of the keyboard 6. Other aspects are the same as for the rear-mounted in-vehicle equipment 3 of the in-vehicle equipment system 1 of the first embodiment.

In this event, the circuit configuration of the front-mounted in-vehicle equipment 2 and the rear-mounted in-vehicle equipment 3 is the same as for the in-vehicle equipment system 1 of the first embodiment and is not described, with a description being given only of the procedure for the control of processing of the front-mounted in-vehicle equipment 2 by the rear-mounted in-vehicle equipment 3.

Figure 8:
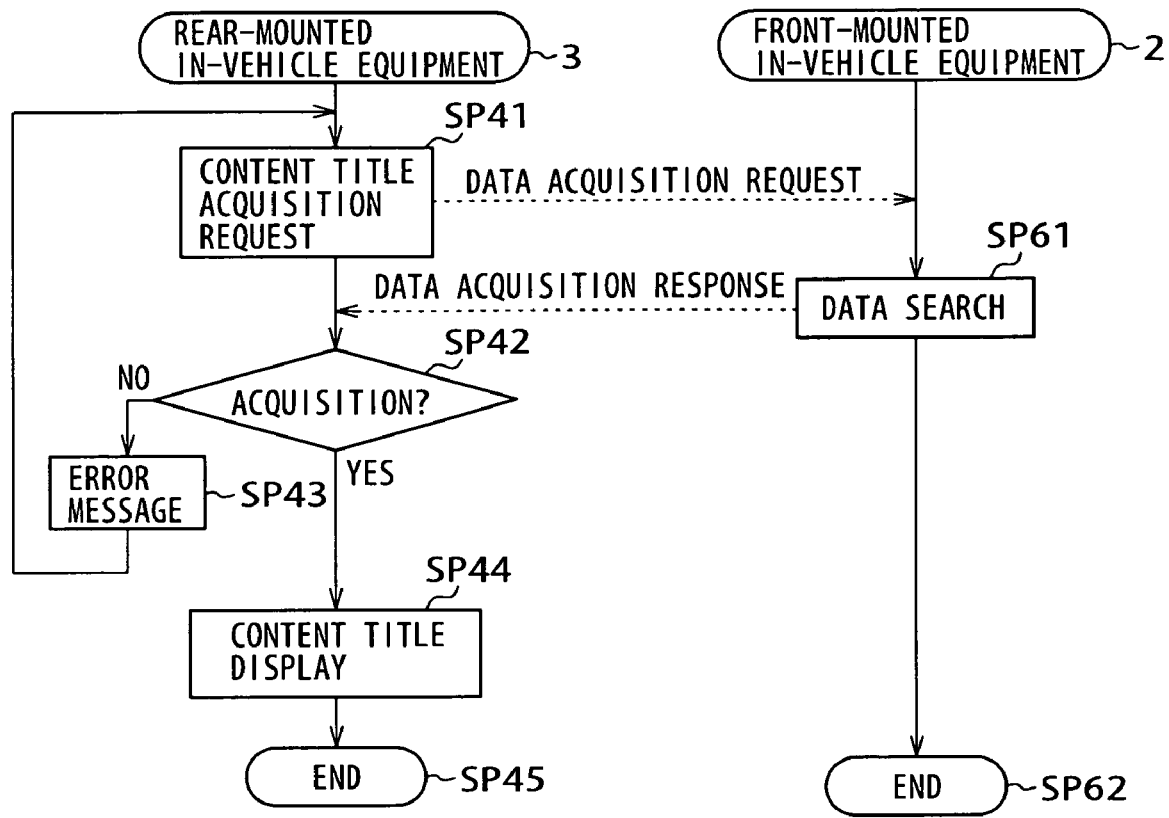
FIG. 8 is a flowchart showing the procedure for content title acquisition and display processing.
Figure 9:
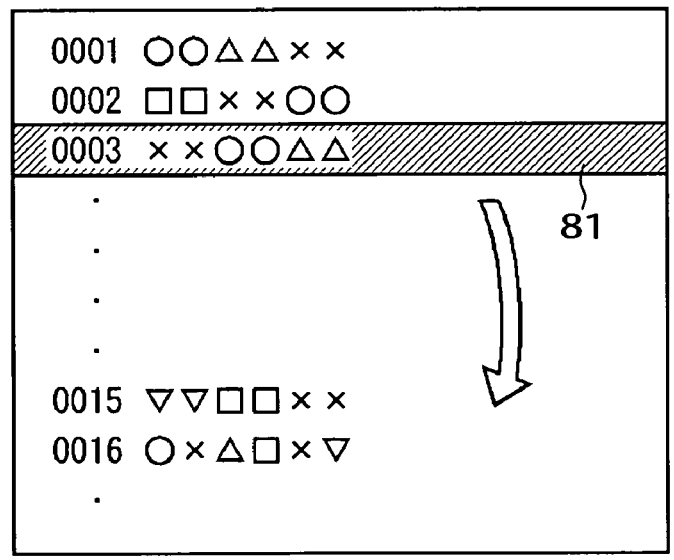
FIG. 9 is an outline view showing a content switching screen for the rear-mounted in-vehicle equipment.
Figure 10:
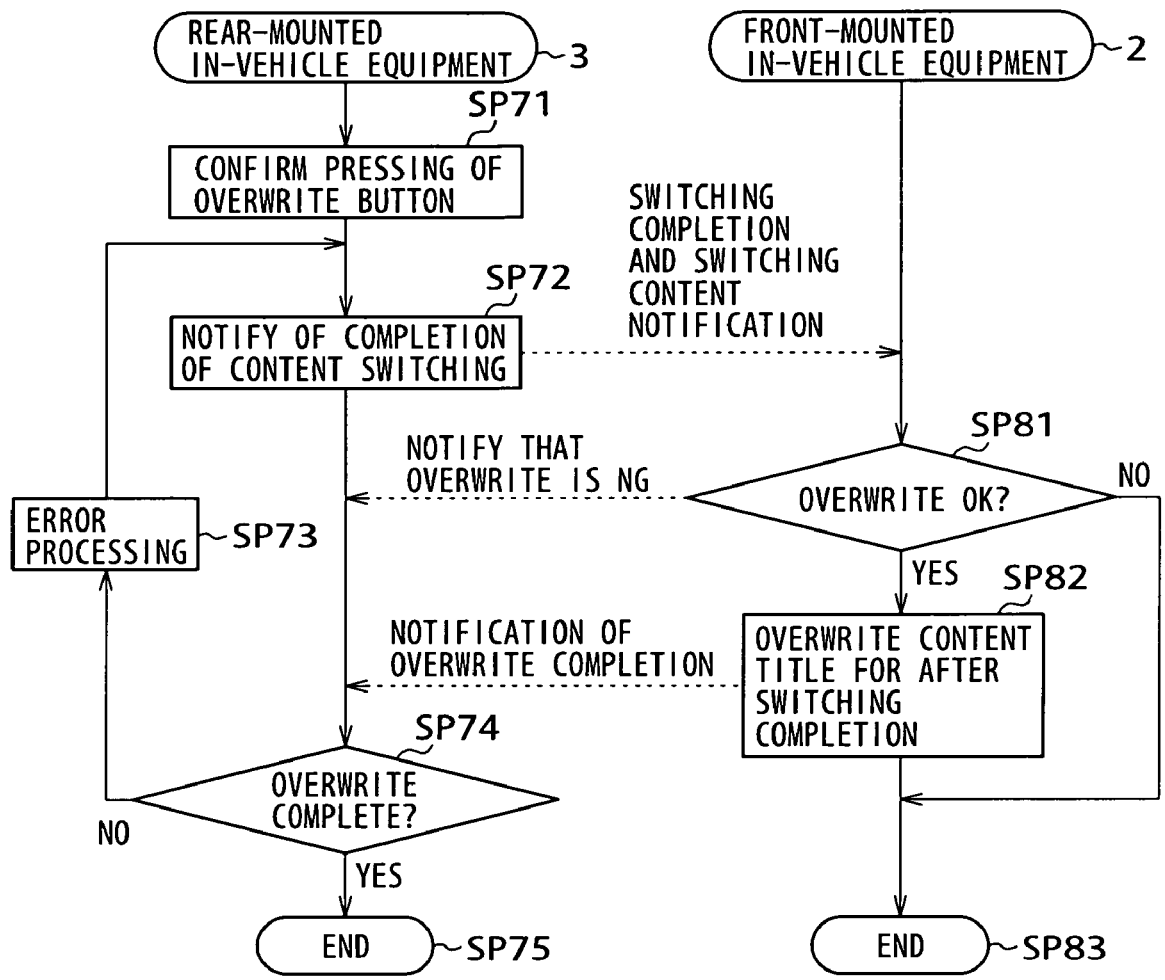
FIG. 10 is a flowchart showing the procedure for content switching processing.
Figure 11:
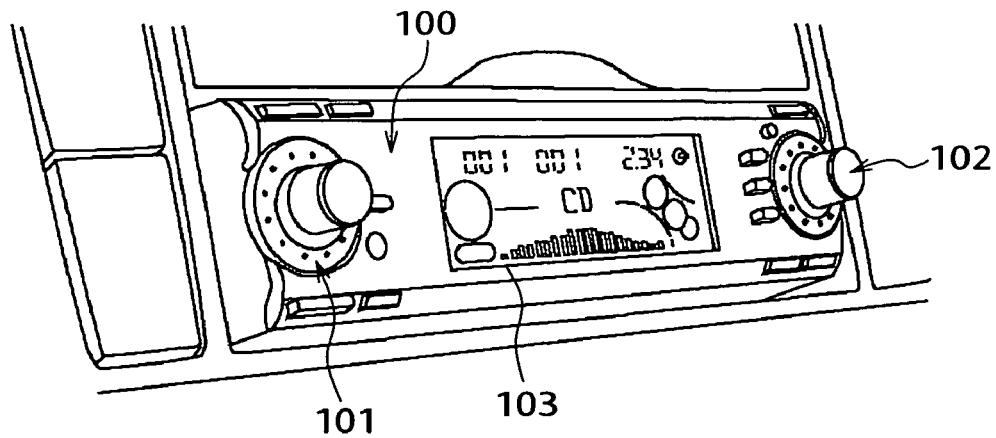
FIG. 11 is an outline view showing a hardware switch of in-vehicle equipment of the related art.
Figure 12:
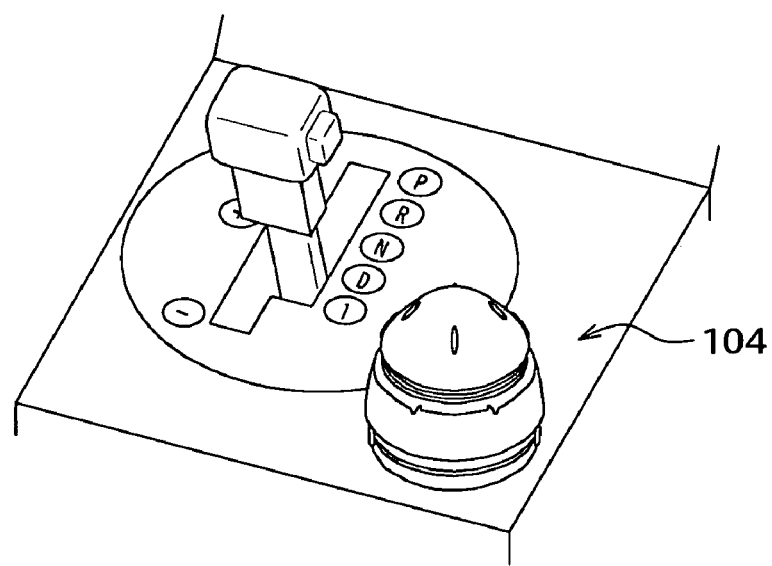
FIG. 12 is an outline view showing a configuration (1) for a remote controller of the related art.
Figure 13:
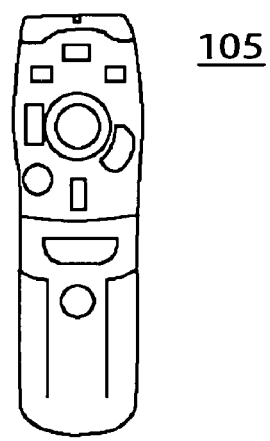
FIG. 13 is an outline view showing a configuration (2) for a remote controller of the related art.
Figure 14:
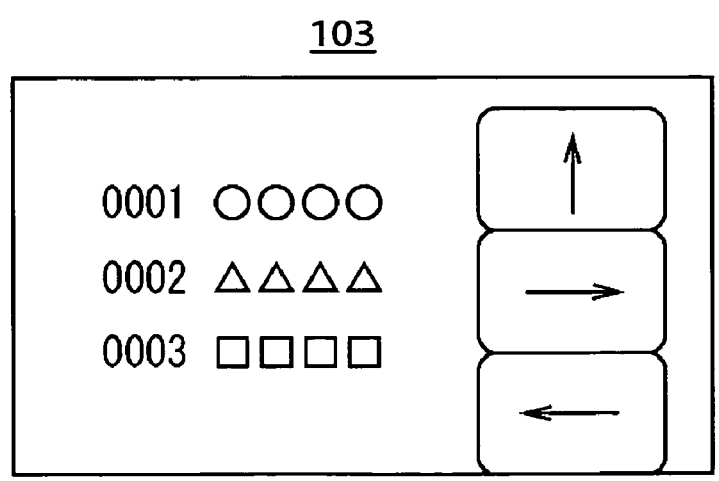
FIG. 14 is an outline view showing an edit screen for a car audio screen of in-vehicle equipment of the related art.

(2-2) Processing Procedure for Control of Front-mounted In-vehicle Equipment by Rear-mounted In-vehicle Equipment Next, a description is given using FIG. 8 to FIG. 10 of the flow for controlling the front-mounted in-vehicle equipment 2 from the rear-mounted in-vehicle equipment 3 at the in-vehicle equipment system 70.

As shown in FIG. 8, when it is confirmed that a content switching mode for changing the playback order of the plurality of content possessed by the front-mounted in-vehicle equipment 2 is set by a passenger in the rear passenger seat in step SP41, the CPU 41 of the rear-mounted in-vehicle equipment 3 makes a content title acquisition request to the front-mounted in-vehicle equipment 2 according to an operation of the game controller 71 and proceeds to the next step SP42.

In this event, in step SP61, the CPU 11 of the front-mounted in-vehicle equipment 2 recognizes the content of the content title acquisition request from the rear-mounted in-vehicle equipment 3, searches the hard disc 21 for, for example, all content titles for movies etc. in the possession of the front-mounted in-vehicle equipment 2 as data according to this content title acquisition request, outputs the results of this search to the rear-mounted in-vehicle equipment 3 and proceeds to the following step SP62 so that processing for the front-mounted in-vehicle equipment 2 is complete.

On the other hand, in step SP42, the CPU 41 of the rear-mounted in-vehicle equipment 3 determines whether or not a plurality of content titles constituted by the search results have been acquired from the front-mounted in-vehicle equipment 2. When the results of this determination are negative, step SP43 is proceeded to, an error message such as "acquisition not possible" is displayed at the display device 5, and step SP41 is returned to.

If an affirmative result is then obtained with respect to this in step SP42, the CPU 41 of the rear-mounted in-vehicle equipment 3 acquires all of the content titles from the front-mounted in-vehicle equipment 2. The CPU 41 of the rear-mounted in-Vehicle equipment 3 then proceeds to the next step SP44, all of the content titles are displayed at the display device 5, the next step SP45 is gone to and the acquisition of the content titles and the display processing procedure are complete.

In this event, as shown in FIG. 9, the CPU 41 of the rear-mounted in-vehicle equipment 3 displays a content switching screen 80 showing a list of all the content titles possessed by the front-mounted in-vehicle equipment 2 at the display device 5, and, for example, displays a content title 81 for the number 0003 selected by a passenger in the rear seating in reverse. This may then be dragged and dropped by a passenger so that, for example, the content playback order of numbers 0001, 0002, 0015 . . . , 0003 and 0016 is changed over in response to shifting of the portion for the content title for number 0015.

The CPU 41 of the rear-mounted in-vehicle equipment 3 not only changes the content playback order but is also capable of changing the numbers 0001, 0002 . . . , 0015, and 0016 by deleting the content title 81 of the number 0003 displayed in an inverted manner.

In this event, at the in-vehicle equipment system 70, it is possible to set a data protection function in advance with respect to both the rear-mounted in-vehicle equipment 3 and the front-mounted in-vehicle equipment 2 in order to prevent content from being erroneously deleted by a passenger in the rear seating without the knowledge of a driver in the front seating.

In this case also, at the in-vehicle equipment system 70, it is possible to set and release a data protection function for the front-mounted in-vehicle equipment 2 and the rear-mounted in-vehicle equipment 3 according to operations of the game controller 71 of the rear-mounted in-vehicle equipment 3. It is then not possible to change or delete the content playback order when the data protection function is set.

As shown in FIG. 10, after carrying out editing at the content switching screen 80 in step SP71, when the CPU 41 of the rear-mounted in-vehicle equipment 3 confirms pressing of the overwrite button by a passenger in the rear seating, the next step SP72 is proceeded to.

In step SP72, the CPU 41 of the rear-mounted in-vehicle equipment 3 notifies the front-mounted in-vehicle equipment 2 that content switching processing by the rear-mounted in-vehicle equipment 3 is complete, transmits the content of these content switching results and proceeds to the next step SP74.

In this event, in step SP81, the CPU 11 of the front-mounted in-vehicle equipment 2 determines whether or not there is no problem with overwriting the content title in the possession of the front-mounted in-vehicle equipment 2 with the content switching results.

In this event, in the event that it is determined that the driver in the front seat does not authorize the overwriting with the content of the switching results, or in the event that the hard disc 21 or the non-volatile memory 14 to which the content of the editing results are to be re-written are write-protected, a negative result is obtained, and the rear-mounted in-vehicle equipment 3 is notified that "overwriting is not possible".

When an affirmative result is obtained in step SP81 in this respect, the CPU 11 of the front-mounted in-vehicle equipment 2 goes to the next step SP82, updates the data for the content title by overwriting with the content switching results, transmits notification of overwrite completion to the rear-mounted in-vehicle equipment 3, proceeds to the next step SP83, and processing is complete.

In step SP74, the CPU 41 of the rear-mounted in-vehicle equipment 3 determines whether or not overwriting is complete, obtains a negative result when notification of overwrite completion is not received from the front-mounted in-vehicle equipment 2 and proceeds to step SP73, displays an indication that overwrite processing could not be carried out as error processing on the display device 5, and repeats the processing from step SP72 onwards.

With respect to this, in step SP74, when receipt of an overwrite completion notification from the front-mounted in-vehicle equipment 2 is detected by the CPU 41 of the rear-mounted in-vehicle equipment 3, an affirmative result is obtained, the next step SP75 is proceeded to, and the content switching processing procedure is complete.

(2-3) Operation and Results

In the above configuration, in the in-vehicle equipment system 70, all content titles relating to content in the possession of the front-mounted in-vehicle equipment 2 is acquired using the rear-mounted in-vehicle equipment 3. These are then displayed at the display device 5 of the rear-mounted in-vehicle equipment 3 and content switching operation can then be carried out by a passenger in the rear seating via the game controller 71.

As a result, the driver in the front seat does not have to carry out content switching operations by themselves and it is no longer necessary to perform complex input operations via the hardware switch 18.

Further, at the in-vehicle equipment system 70, the content switching results are sent to the front-mounted in-vehicle equipment 2. The content switching results are then confirmed by the driver and an invitation is also made to determine whether or not to perform overwrite processing. This means-that it is possible to reflect the intent of the driver in the front seat in the content of the results of content switching carried out by a passenger in the rear seating. It is therefore possible to prevent important content titles from being overwritten by the driver and to prevent the playback order of the content from being changed around, etc.

Namely, a driver support system can be implemented at the in-vehicle equipment system 70 where, intrinsically speaking, content switching operations to be carried out by the driver at the front-mounted in-vehicle equipment 2 can be implemented by a passenger located in the vicinity of the rear seating instead of the driver via the rear-mounted in-vehicle equipment 3.

Further, at the in-vehicle equipment system 70, the content switching operation can be carried out via the keyboard 6 connected to the rear-mounted in-vehicle equipment 3 and the display device 5 with a screen size that is larger than that of the display section 19 of the front-mounted in-vehicle equipment 2 rather than via the hardware switch 18 of the front-mounted in-vehicle equipment 2. The input operation is therefore markedly more straightforward and easier for operation and increases the degree of freedom of the passenger.

According to the above configuration, at the in-vehicle equipment system 70 it is possible for all of the content titles for content possessed by the front-mounted in-vehicle equipment 2 to be acquired from the rear-mounted in-vehicle equipment 3 and for a content switching operation to be carried out by a passenger on the display device 5 of the rear-mounted in-vehicle equipment 3 via the game controller 71. It is therefore possible to implement a driver support system where the content switching operation can be executed in a dramatically more straightforward manner inside a vehicle and where a driver is not forced to perform complex input operations.

(3) Other Preferred Embodiments

In the first and second preferred embodiments described above, a description is given of the case of editing music data titles and content titles possessed by the front-mounted in-vehicle equipment 2 using the display device 5 of the rear-mounted in-vehicle equipment 3 and switching the order of playback but the present invention is by no means limited in this respect, and switching of images displayed by the display section 19 of the front-mounted in-vehicle equipment 2 using the rear-mounted in-vehicle equipment 3 is also possible.

In the first and second embodiments described above, a description is given of the case where music data titles and content titles are edited and the playback order switched but the present invention is by no means limited in this respect and may also be applied to performing editing operations relating to various data stored in the hard disc 21 and the non-volatile memory 14 possessed by the front-mounted in-vehicle equipment 2 on a screen of the display device 5 of the rear-mounted in-vehicle equipment 3.

Moreover, in the first and second embodiments described above, a description is given of the case where music data titles and content titles are edited and the playback order switched but the present invention is by no means limited in this respect and may also be applied to switching sources such as CDs and MDs the front-mounted in-vehicle equipment 2 is capable of playing back on a screen of the display device 5 of the rear-mounted in-vehicle equipment 3.

In the first and second embodiments described above, a description is given of the case where music data titles and content titles are edited and playback order is switched over by the display device 5 of the rear-mounted in-vehicle equipment 3 but the present invention is by no means limited in this respect, and may also be applied to executing various setting operations that are required to be carried out for a navigation function such as navigation destination setting or route search etc. on a screen of a display device 5 of the rear-mounted in-vehicle equipment 3 and sending these results to the front-mounted in-vehicle equipment 2 so that these results are reflected.

In the first and second embodiments, a description is given of the case where a wired connection having a cable 4 is taken to be the means for connecting the front-mounted in-vehicle equipment 2 and the rear-mounted in-vehicle equipment 3 but the present invention is by no means limited in this respect, so that connection can be carried out by connecting means other than cables or wires and also by wireless or contactless connection employing IEEE (Institute of Electrical and Electronic Engineers) 802.11g or others, or Bluetooth communication system, for example, may also be employed.

In the first embodiment and the second embodiment a description is given of cases where the in-vehicle equipment systems 1 and 70 are configured from front-mounted in-vehicle equipment 2 comprised of an integrated audio unit of a CD and an MD and a rear-mounted in-vehicle equipment 3 constituted by a game device. However, the present invention is by no means limited in this respect and the in-vehicle equipment systems 1 and 70 may also be configured from front-mounted in-vehicle equipment 2 constituted by a navigation device and rear-mounted in-vehicle equipment 3 constituted by a DVD player, or by in-vehicle equipment systems 1 and 70 configured from other types of front-mounted in-vehicle equipment 2 and rear-mounted in-vehicle equipment 3.

Moreover, in the first and second embodiments, a description is given of cases where results of editing relating to music data titles and content titles and content switching results for switching content playback order carried out at the rear-mounted in-vehicle equipment 3 are sent to the front-mounted in-vehicle equipment 2 so that a driver in the front seating is invited to make a determination as to whether or not to overwrite using the editing results or the content switching results. However, the present invention is by no means limited in this respect and it is also possible to send the content sequentially to the front-mounted in-vehicle equipment 2 in intermediate stages of editing relating to the title or in intermediate stages for switching the content playback order so as to invite a determination by the driver in the front seating.

The in-vehicle equipment system according to the preferred embodiments of the present invention may be utilized in various applications for controlling front-mounted in-vehicle equipment from rear-mounted in-vehicle equipment at positions separated from each other with, for example, front-mounted in-vehicle equipment positioned at the front of the vehicle internal space and rear-mounted in-vehicle equipment positioned at the rear of the vehicle internal space.

What is claimed is:

1. An in-vehicle equipment system comprising:
    front-mounted in-vehicle equipment arranged at a front portion of a vehicle inner space, the front-mounted in-vehicle equipment including an integrated audio unit;
    rear-mounted in-vehicle equipment arranged at a rear portion of the vehicle inner space; and
    connection adapted to connect said front-mounted in-vehicle equipment and said rear-mounted in-vehicle equipment; wherein
    said rear-mounted in-vehicle equipment is configured to control said front-mounted in-vehicle equipment via an input means,
    said rear-mounted in-vehicle equipment is configured to make a transfer request for title information for music data from said front-mounted in-vehicle equipment, edit the title information or order of music data, and send the results of editing back to said front-mounted in-vehicle equipment, the title information including a song title, and
    said front-mounted in-vehicle equipment is configured to deny the transfer request from said rear-mounted in-vehicle equipment.

2. The in-vehicle equipment system as described in claim 1, wherein said rear-mounted in-vehicle equipment is adapted to switch a source of content outputted from said front-mounted in-vehicle equipment.

3. The in-vehicle equipment system as described in claim 1, wherein said rear-mounted in-vehicle equipment is adapted to switch an image displayed by said front-mounted in-vehicle equipment.

4. The in-vehicle equipment system as described in claim 1, wherein said rear-mounted in-vehicle equipment controls setting and release of a data protection function of said front-mounted in-vehicle equipment.

5. The in-vehicle equipment system as described in claim 1, wherein an operation of editing content in possession of said front-mounted in-vehicle equipment is carried out using a screen of said rear-mounted in-vehicle equipment.

6. The in-vehicle equipment system as described in claim 1, wherein an operation of editing content of a storage device in possession of said front-mounted in-vehicle equipment is carried out using a screen of said rear-mounted in-vehicle equipment.

7. A Rear-mounted in-vehicle apparatus comprising:
    connection adapted to connect a front-mounted in-vehicle equipment arranged at a front part of a vehicle internal space and a rear-mounted in-vehicle equipment arranged at a rear portion of the vehicle internal space; and
    controller for controlling said front-mounted in-vehicle equipment, including an integrated audio unit, from said rear-mounted in-vehicle equipment via input means, wherein
    said controlling of said front-mounted in-vehicle equipment from said rear-mounted in-vehicle equipment includes transferring title information for music data from said front-mounted in-vehicle equipment to said rear-mounted in-vehicle equipment, editing the title information or order of the music data with said rear-mounted in-vehicle equipment, and sending edited data back to said front-mounted in-vehicle equipment, the title information including a song title, and
    said controlling of said front-mounted in-vehicle equipment from said rear-mounted in-vehicle equipment includes notifying said rear-mounted in-vehicle equipment when the edited data is not permitted to overwrite original data.

8. An in-vehicle equipment control method comprising the steps of:
    connecting front-mounted in-vehicle equipment arranged at a front part of a vehicle internal space and rear-mounted in-vehicle equipment arranged at a rear part of the vehicle internal space; and
    controlling said front-mounted in-vehicle equipment, including an integrated audio unit, from said rear-mounted in-vehicle equipment via an input means, wherein
    said controlling of said front-mounted in-vehicle equipment from said rear-mounted in-vehicle equipment includes transferring title information for music data from said front-mounted in-vehicle equipment to said rear-mounted in-vehicle equipment, editing the title information or order of the music data with said rear-mounted in-vehicle equipment, and sending edited data back to said front-mounted in-vehicle equipment, the title information including a song title, and
    said controlling of said front-mounted in-vehicle equipment from said rear-mounted in-vehicle equipment includes notifying said rear-mounted in-vehicle equipment when the edited data is not permitted to overwrite original data.

* * * * *